United States Patent [19]

Park

[11] Patent Number: 5,485,153
[45] Date of Patent: Jan. 16, 1996

[54] SINUSOIDAL WAVE GENERATION APPARATUS

[75] Inventor: Sang-Gon Park, Seoul, Rep. of Korea

[73] Assignee: Samsung Electronics Co., Ltd., Suwon, Rep. of Korea

[21] Appl. No.: 133,918

[22] Filed: Oct. 12, 1993

[30] Foreign Application Priority Data

Oct. 15, 1992 [KR] Rep. of Korea ...................... 92-18953

[51] Int. Cl.$^6$ .................................................. H03M 1/66
[52] U.S. Cl. ........................................... 341/147; 341/144
[58] Field of Search ................................... 341/144, 147, 341/152

[56] References Cited

U.S. PATENT DOCUMENTS

| | | | |
|---|---|---|---|
| 3,689,914 | 9/1972 | Butler | 341/147 |
| 4,296,407 | 10/1981 | Minakuchi | 341/147 |
| 4,782,324 | 11/1988 | Underwood | 341/147 |
| 5,146,224 | 9/1992 | Kitayoshi | 341/147 |

FOREIGN PATENT DOCUMENTS 1-133200  9/1989  Japan .

OTHER PUBLICATIONS

Analog–Digital Conversion Handbook, Analog Devices, Inc. (Daniel Sheingold, Ed.), 1986, pp. 124–127.

*Primary Examiner*—Marc S. Hoff
*Attorney, Agent, or Firm*—Burns, Doane, Swecker & Mathis

[57] ABSTRACT

A sinusoidal wave generation apparatus comprising a pulse generator for generating a pulse signal of a precise frequency in response to a clock signal from an oscillator, a frequency divider for dividing the precise frequency of the pulse signal from the pulse generator by a desired ratio to output a desired frequency of pulse signal, an up/down counter for alternately up-counting and down-counting the frequency-divided pulse signal from the frequency divider and outputting up/down-counted values corresponding to digital triangular wave data, a digital/analog converter for converting the digital triangular wave data of the up/down-counted values from the up/down counter into an analog triangular wave signal, a low pass filter for filtering a harmonic component of the analog triangular wave signal from the digital/analog converter to output a sinusoidal wave signal, a comparison circuit for comparing the up/down-counted values from the up/down counter with predetermined upper and lower reference values, respectively, and outputting pulse signals in accordance with the compared results, and a latch unit for changing the up-counting operation of the up/down counter to the down-counting operation thereof and vice versa in response to the pulse signals from the comparison circuit.

5 Claims, 3 Drawing Sheets

SINUSOIDAL WAVE GENERATION APPARATUS

BACKGROUND OF THE INVENTION

1. Field of the Invention

The present invention relates to a sinusoidal wave generation apparatus for generating a sinusoidal wave signal of a precise frequency.

2. Description of the Prior Art

In conventional sinusoidal wave generation apparatus, a sinusoidal wave signal is generated using an analog method in which an operational amplifier and a passive element are combined, or using a digital/analog conversion method in which sine wave data is stored in a read only memory (ROM) and then converted into an analog signal at a fixed period in response to a clock pulse.

However, such a conventional sinusoidal wave generation apparatus using the analog method has a disadvantage in that it is difficult to vary an amplitude or a frequency of the sinusoidal wave signal in a circuitry of a fixed construction because the amplitude or the frequency of the sinusoidal wave signal is determined according to a value of the passive element. Also, in the case where the frequency of the sinusoidal wave signal is intended to become precise, a precision of the passive element is required. This results in an increase in the cost. Further, it is hard to use the passive element in generating the sinusoidal wave signal of the precise frequency since the value of the passive element is sensitive to an variation in circumstances such as temperature, humidity, etc.

Also, another conventional sinusoidal wave generation apparatus using the digital/analog conversion method is desirable to generate the sinusoidal wave of a precise frequency since the clock frequency is precise, but has the disadvantage that the ROM is required and the amplitude of the sinusoidal wave signal cannot be varied because the sinusoidal wave signal is generated on the basis of the sine wave data stored in the ROM. One example of this form of conventional sinusoidal wave generation apparatus is disclosed in Japanese Utility Model Laid-open Publication No. Heisei 1-133200 and is shown in FIG. 1, herein.

As shown in FIG. 1, the conventional sinusoidal wave generation apparatus using the digital/analog conversion method comprises an oscillator 1 for generating a square wave signal, a frequency divider 2 for dividing the square wave signal from the oscillator 1 into a plurality of frequency signals, a selector 3 for selecting one of the plurality of frequency signals from the frequency divider 2, a counter 4 for counting a pulse of the frequency signal selected by the selector 3, a programmable read only memory (PROM) 5 for outputting sinusoidal wave data stored therein in response to an output signal from the counter 4, and a digital/analog (D/A) converter 6 for converting the output data from the PROM 5 into an analog signal. However, this conventional sinusoidal wave generation apparatus has the above-mentioned problems.

SUMMARY OF THE INVENTION

Therefore, the present invention has been made in view of the above problems, and it is an object of the present invention to provide a sinusoidal wave generation apparatus for generating a sinusoidal wave signal using an up/down counter in which a frequency and an amplitude of the sinusoidal wave signal can be varied and the frequency is precise.

It is another object of the present invention to provide a sinusoidal wave generation apparatus for generating a sinusoidal wave signal using an up/down counter in which the construction is simple and the manufacturing cost is low.

In accordance with the present invention, the above and other objects can be accomplished by a provision of a sinusoidal wave generation apparatus comprising pulse generation means for generating a pulse signal of a precise frequency in response to a clock signal from an oscillator, frequency division means for dividing the precise frequency of the pulse signal from said pulse generation means by a desired ratio to output a desired frequency of pulse signal, up/down counting means for alternately up-counting and down-counting the frequency-divided pulse signal from said frequency division means and outputting up/down-counted values corresponding to digital triangular wave data, digital/analog conversion means for converting the digital triangular wave data of the up/down-counted values from said up/down counting means into an analog triangular wave signal, low pass filtering means for filtering a harmonic component of the analog triangular wave signal from said digital/analog conversion means to output a sinusoidal wave signal, comparison means for comparing the up/down-counted values from said up/down counting means with predetermined upper and lower reference values, respectively, and outputting pulse signals in accordance with the compared results, and latch means for changing the up-counting operation of said up/down counting means to the down-counting operation thereof and vice versa in response to the pulse signals from said comparison means.

BRIEF DESCRIPTION OF THE DRAWINGS

For better understanding of the nature and objects of the invention, reference is to be made to the following detailed description in connection with the accompanying drawings in which.

DETAILED DESCRIPTION OF THE PREFERRED EMBODIMENT

Figure 1:
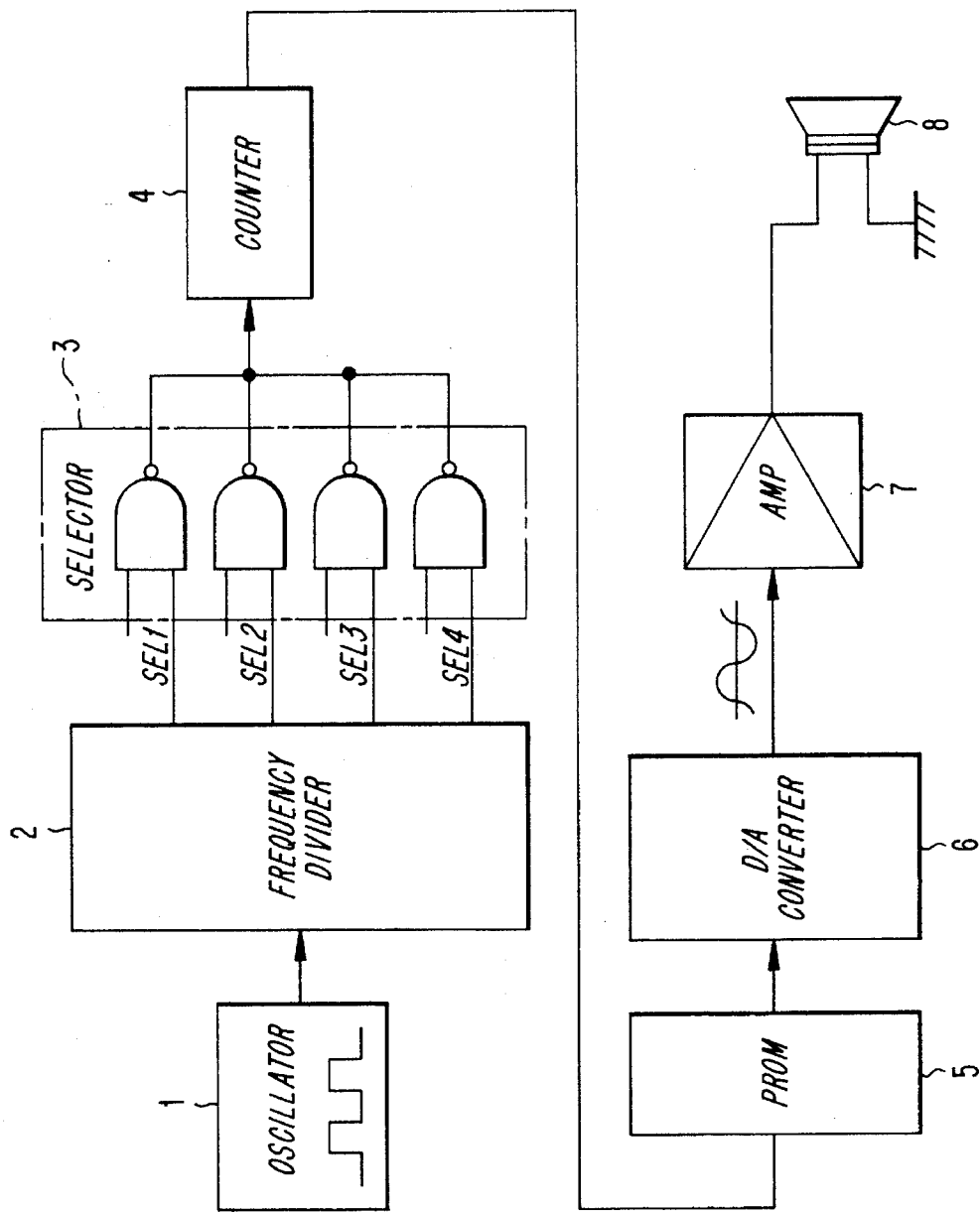
FIG. 1 is a block diagram of a conventional sinusoidal wave generation apparatus.
Figure 2:
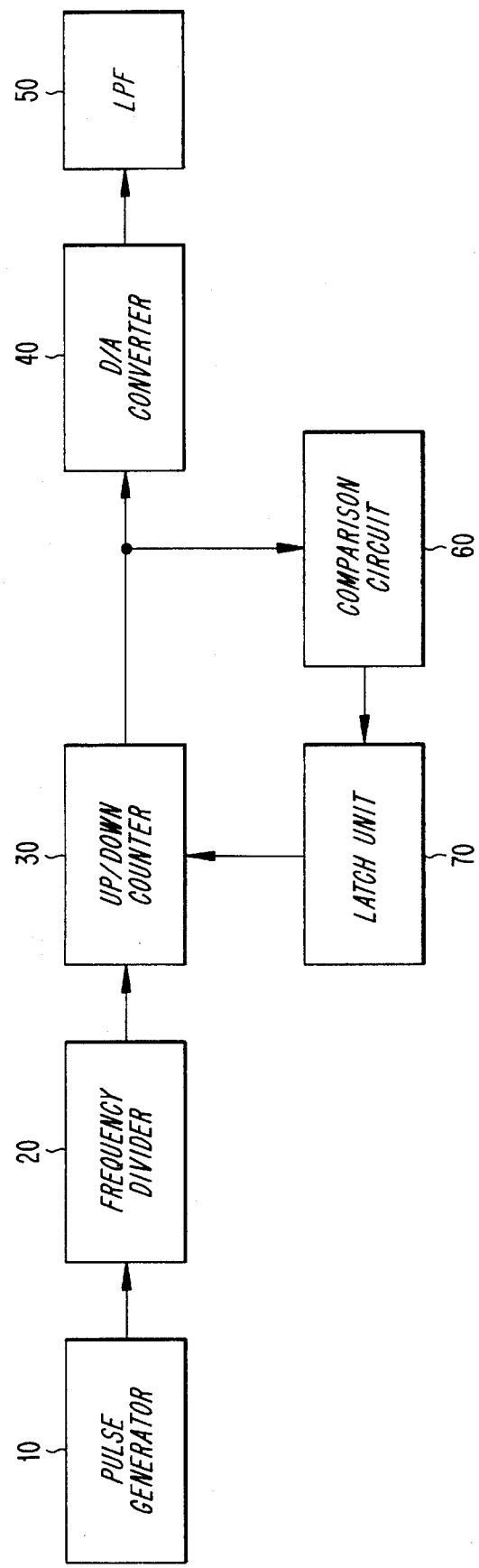
FIG. 2 is a schematic block diagram of a sinusoidal wave generation apparatus in accordance with an embodiment of the present invention.
Figure 3:
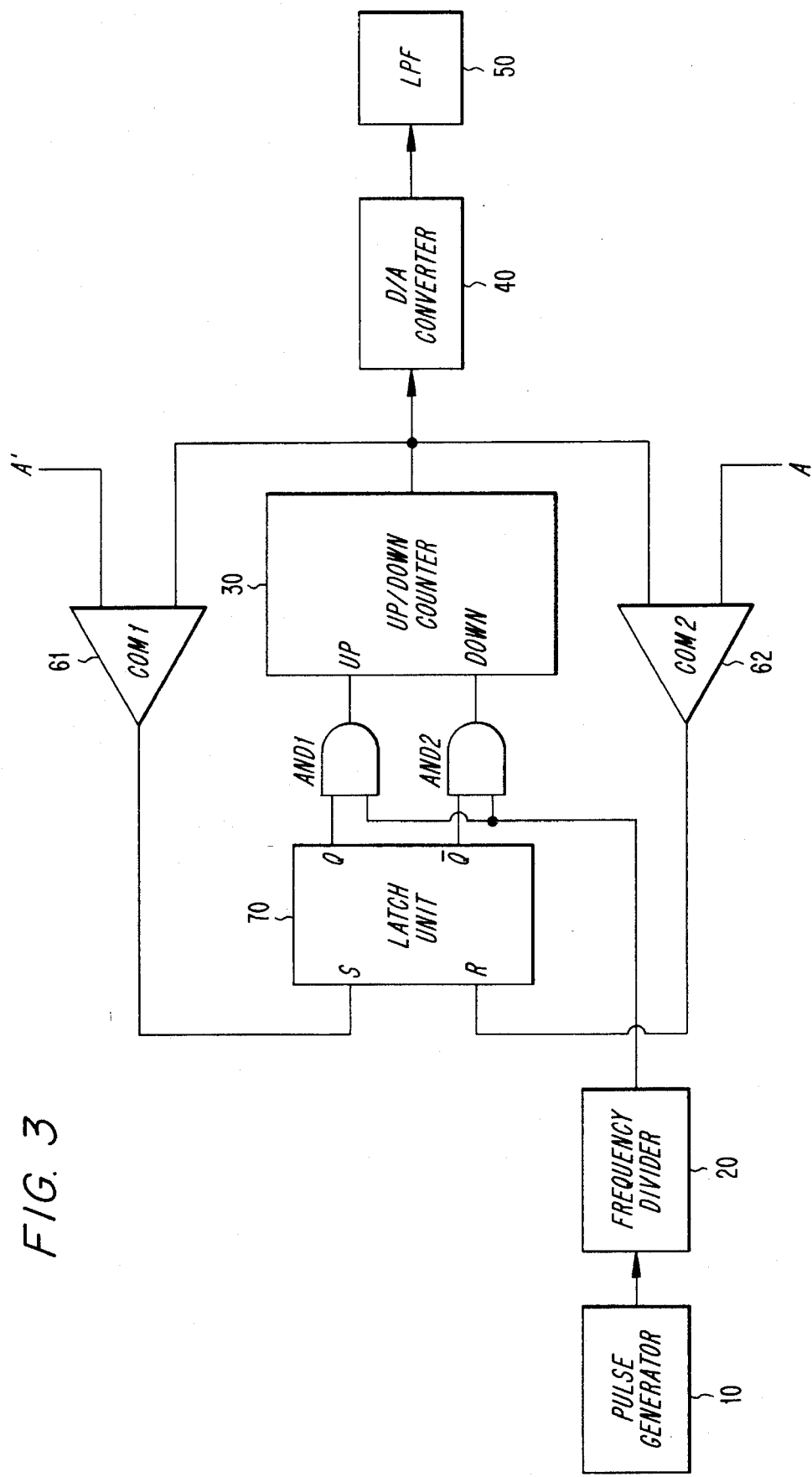
FIG. 3 is a detailed block diagram of the sinusoidal wave generation apparatus in FIG. 2.

FIG. 2 is a schematic block diagram of a sinusoidal wave generation apparatus in accordance with an embodiment of the present invention and FIG. 3 is a detailed block diagram of the sinusoidal wave generation apparatus in FIG. 2. As shown in these drawings, the sinusoidal wave generation apparatus comprises a pulse generator 10 for generating a pulse signal of a precise frequency in response to a clock signal from an oscillator (not shown), and a frequency divider 20 for dividing the precise frequency of the pulse signal from the pulse generator 10 by a desired ratio to output a desired frequency of the pulse signal.

An up/down counter 30 is provided in the sinusoidal wave generation apparatus to alternately up-count and down-count the frequency-divided pulse signal from the frequency divider 20 and output up/down-counted values corresponding to digital triangular wave data. The up/down counter 30 advances from its up-counting operation to its down-counting operation and vice versa in response to output signals from a latch unit 70 as will be described in detail later.

A digital/analog (D/A) converter 40 is also provided in the sinusoidal wave generation apparatus to convert the digital triangular wave data of the up/down-counted values from the up/down counter 30 into an analog triangular wave signal.

The sinusoidal wave generation apparatus also comprises a low pass filter (LPF) 50 for filtering a harmonic component of the analog triangular wave signal from the D/A converter 40 to output a sinusoidal wave signal, and a comparison circuit 60 for comparing the up/down-counted values from the up/down counter 30 with predetermined upper and lower reference values, respectively, and outputting pulse signals in accordance with the compared results.

The comparison circuit 60 is provided with a first comparator 61 for comparing the down-counted value from the up/down counter 30 with the predetermined lower reference value A' and outputting the pulse signal if the down-counted value from the up/down counter 30 is the same as the predetermined lower reference value A' as a result of the comparison, and a second comparator 62 for comparing the up-counted value from the up/down counter 30 with the predetermined upper reference value A and outputting the pulse signal if the up-counted value from the up/down counter 30 is the same as the predetermined upper reference value A as a result of the comparison.

The latch unit 70 is adapted to change the up-counting operation of the up/down counter 30 to the down-counting operation thereof and vice versa in response to the pulse signals from the comparison circuit 60.

The operation of the sinusoidal wave generation apparatus with the above-mentioned construction in accordance with the embodiment of the present invention will hereinafter be described in detail.

First, upon receiving the clock signal from the oscillator, the pulse generator 10 generates the pulse signal of the precise frequency and outputs the generated pulse signal to the frequency divider 20.

The frequency divider 20 divides the precise frequency of the pulse signal from the pulse generator 10 by the desired ratio to output the pulse signal of the frequency desired by the user.

The frequency-divided pulse signal from the frequency divider 20 is applied to the up/down counter 30 through an AND gate AND1 or AND2 for the up or down-counting operation of the up/down counter 30.

For example, if the up/down counter 30 starts its up-counting operation for the frequency-divided pulse signal from the frequency divider 20, then the counted value of the up/down counter 30 is continuously increased. The counted value of the up/down counter 30 is compared with the predetermined upper reference value A by the second comparator 62. If the counted value of the up/down counter 30 is the same as the predetermined upper reference value A as a result of the comparison, the second comparator 62 outputs its pulse signal to a reset terminal R of the latch unit 70, thereby causing a high signal to be outputted from an output terminal $\overline{Q}$ of the latch unit 70. In response to the high signal from the output terminal $\overline{Q}$ of the latch unit 70, the AND gate AND2 passes the frequency-divided pulse signal from the frequency divider 20 to a DOWN input terminal of the up/down counter 30. As a result, the up/down counter 30 starts its down-counting operation for the frequency-divided pulse signal from the frequency divider 20.

If the up/down counter 30 begins to down-count the frequency-divided pulse signal from the frequency divider 20, then the counted value of the up/down counter 30 is continuously decreased. The counted value of the up/down counter 30 is compared with the predetermined lower reference value A' by the first comparator 61. If the counted value of the up/down counter 30 is the same as the predetermined lower reference value A' as a result of the comparison, the first comparator 61 outputs its pulse signal to a set terminal S of the latch unit 70, thereby causing a high signal to be outputted from an output terminal Q of the larch unit 70. In response to the high signal from the output terminal Q of the latch unit 70, the AND gate AND1 passes the frequency-divided pulse signal from the frequency divider 20 to an UP input terminal of the up/down counter 30. As a result, the up/down counter 30 starts its up-counting operation for the frequency-divided pulse signal from the frequency divider 20.

As the up/down counter 30 alternately up-counts and down-counts the frequency-divided pulse signal from the frequency divider 20, it outputs the digital triangular wave data of the up/down-counted values to the D/A converter 40, which then converts the received digital triangular wave data into the analog triangular wave signal. The low pass filter 50 filters the harmonic component contained in the analog triangular wave signal from the D/A converter 40. As a result of the filtering, the low pass filter 50 outputs the sinusoidal wave signal of the precise frequency.

Noticeably, the frequency and amplitude of the sinusoidal wave signal can be varied according to the predetermined upper and lower reference values of the first and second comparators 61 and 62 and the precise frequency of the pulse signal divided by the frequency divider 20.

As apparent from the above description, according to the present invention, the up/down counter is used to generate the sinusoidal wave signal in which the frequency and amplitude can be varied and the frequency is precise. The use of the up/down counter has the effect of making the construction simple and the manufacturing cost low.

The foregoing description of the preferred embodiment has been presented for the purpose of illustration and description. It is not intended to limit the scope of this invention. Many modifications and variations are possible in light of the above teaching. It should be noted that the present invention can be applied to all kinds of apparatus within the scope of the above presentation.

What is claimed is:

1. A sinusoidal wave generation apparatus comprising:

pulse generation means for generating a pulse signal of a precise frequency in response to a clock signal;

frequency division means for dividing the precise frequency of the pulse signal from said pulse generation means by a desired ratio to output a desired frequency of pulse signal;

up/down counting means for alternately up-counting and down-counting the frequency-divided pulse signal from said frequency division means and outputting alternately up-counted and down-counted values corresponding to digital triangular wave data;

a plurality of AND gates for receiving the frequency-divided pulse signal from the frequency division means and inputting said frequency-divided signal into said up-down counting means for the up or down-counting operation;

digital/analog conversion means for converting the digital triangular wave data of the up/down-counted values from said up/down counting means into an analog triangular wave signal;

low pass filtering means for filtering a harmonic component of the analog triangular wave signal from said digital/analog conversion means to output a sinusoidal wave signal;

comparison means for comparing the up/down-counted values from said up/down counting means with predetermined upper and lower reference values, respectively, and outputting pulse signals in accordance with the comparison, wherein said comparison means compares the predetermined upper reference value with the up-counted values of the up/down counting means, and if the counted value of the up/down counting means is the same as the predetermined upper reference value, the up/down counting means starts a down-counting operation for the frequency-divided pulse signal from the frequency division means latch means for changing the up-counting operation of said up/down counting means to the down-counting operation thereof and vice versa in response to the pulse signals from said comparison means;

wherein said comparison means includes:
a first comparator, connected to a set input of said latch means and having a first input for receiving predetermined lower reference value and a second input for receiving the down-counted value from said up/down counting means, for comparing the down-counted value from said up/down counting means with the predetermined lower reference value and outputting the pulse signal if the down-counted value from said up/down counting means is equal to the predetermined lower reference value as a result of the comparison; and a second comparator, connected to the reset input of said latch means and having a first input for receiving a predetermined upper reference value and a second input for receiving the up-counted value from said up/down counting means, for comparing the up-counted value from said up/down counting means with the predetermined upper reference value and outputting the pulse signal if the up-counted value from said up/down counting means is equal to the predetermined upper reference value as a result of the comparison.

2. A sinusoidal wave generation apparatus comprising:

pulse generation means for generating a pulse signal of a precise frequency in response to a clock signal;

frequency division means for dividing the precise frequency of the pulse signal from said pulse generation means by a desired ratio to output a desired frequency of pulse signal;

up/down counting means for alternately up-counting and down-counting the frequency-divided pulse signal from said frequency division means and outputting alternately up-counted and down-counted values corresponding to digital triangular wave data;

digital/analog conversion means for converting the digital triangular wave data of the up/down-counted values from said up/down counting means into an analog triangular wave signal;

low pass filtering means for filtering a harmonic component of the analog triangular wave signal from said digital/analog conversion means to output a sinusoidal wave signal;

comparison means for comparing the up/down-counted values from said up/down counting means with predetermined upper and lower reference values, respectively, and outputting pulse signals in accordance with the comparison; and latch means for changing the up-counting operation of said up/down counting means to the down-counting operation thereof and vice versa in response to the pulse signals from said comparison means, said latch means comprising a set and a reset input;

wherein said comparison means includes:
a first comparator, connected to said set input of said latch means and having a first input for receiving a predetermined lower reference value and a second input for receiving the down-counted value from said up/down counting means, for comparing the down-counted value from said up/down counting means with said predetermined lower reference value and outputting the pulse signal if the down-counted value from said up/down counting means is equal to the predetermined lower reference value; and a second comparator, connected to said reset input of said latch means and having a first input for receiving a predetermined upper reference value and a second input for receiving the up-counted value from said up/down counting means, for comparing the up-counted value from said up/down counting means with the predetermined upper reference value and outputting the pulse signal if the up-counted value from said up/down counting means is equal to the predetermined upper reference value.

3. A sinusoidal wave generation apparatus comprising:

means for generating a pulse signal having a desired frequency;

means for counting the pulse signal and outputting values corresponding to digital triangular wave data, said means for counting comprising an up/down counter adapted to alternately count in an up direction and in a down direction and output up-counted values and down-counted values, respectively;

means for converting the values corresponding to digital triangular wave data to an analog triangular wave signal;

means for filtering a harmonic component of the analog triangular wave signal to output a sinusoidal wave signal;

means for comparing said values from said means for counting with predetermined upper and lower reference values and outputting pulse signals in accordance with the comparison, said means for comparing comprising a first comparator for comparing the down-counted value with a predetermined lower reference value and outputting a pulse signal if the down-counted value is equal to the predetermined lower reference value, and a second comparator for comparing the up-counted value with a predetermined upper reference value and outputting a pulse signal if the up-counted value is equal to the predetermined upper reference value; and means, responsive to said means for comparing, for causing said up/down counter to change from counting in an up direction to counting in a down direction and vice versa in response to the pulse signals output from said means for comparing, said means for causing comprising a set input connected to an output of said first comparator and a reset input connected to an output of said second comparator.

4. A sinusoidal wave generation apparatus as set forth in claim 3, wherein said means for generating comprises:

pulse generation means for generating a pulse signal of a precise frequency in response to a clock signal;

frequency division means for dividing the precise frequency of the pulse signal by a desired ratio to output the pulse signal having the desired frequency.

5. A sinusoidal wave generation apparatus as set forth in claim 3, wherein said means for converting comprises a digital to analog converter.

* * * * *